United States Patent
Hoving et al.

[11] Patent Number: 5,916,463
[45] Date of Patent: Jun. 29, 1999

[54] METHOD OF LASER ADJUSTING THE SWITCH-GAP IN A REED SWITCH

[75] Inventors: Willem Hoving; Johannes P. C. Van Dooren, both of Eindhoven, Netherlands

[73] Assignee: U.S. Philips Corporation, New York, N.Y.

[21] Appl. No.: 08/538,511

[22] Filed: Oct. 3, 1995

[30] Foreign Application Priority Data

Oct. 4, 1994 [EP] European Pat. Off. .............. 94202864

[51] Int. Cl.⁶ .............. B23K 26/00; H01H 1/66; H01H 49/00
[52] U.S. Cl. ...................... 219/121.85; 335/151
[58] Field of Search .............. 219/121.65, 121.66, 219/121.85; 29/622; 335/151, 154

[56] References Cited

U.S. PATENT DOCUMENTS

| | | | |
|---|---|---|---|
| 3,670,131 | 6/1972 | Beaud | 29/622 |
| 3,938,066 | 2/1976 | Morrill, Jr. | 335/154 |
| 4,179,798 | 12/1979 | Einbinder et al. | 29/622 |
| 4,520,254 | 5/1985 | Steiger et al. | 219/121.85 |
| 4,900,891 | 2/1990 | Vega et al. | 219/121.65 |
| 5,083,007 | 1/1992 | Spletter et al. | 219/121.64 |

FOREIGN PATENT DOCUMENTS

| | | | |
|---|---|---|---|
| 2918100 | 11/1980 | Germany . | |
| 3-236122 | 10/1991 | Japan | 29/622 |
| 4-112427 | 4/1992 | Japan | 335/151 |
| 5-12951 | 1/1993 | Japan | 29/622 |

*Primary Examiner*—Geoffrey S. Evans
*Attorney, Agent, or Firm*—David R. Treacy

[57] ABSTRACT

A method of adjusting the mutual separation (g) of the two overlapping metallic cantilever members (9, 11) within the vitreous envelope of a reed switch, having a beam (21) of radiant energy to which the envelope is substantially transparent directed for a controlled period of time through the envelope onto a localised area (p) of at least one of the members (11), causing permanent thermally-induced bending of that member (11) about the irradiated area (p).

14 Claims, 1 Drawing Sheet

METHOD OF LASER ADJUSTING THE SWITCH-GAP IN A REED SWITCH

The invention relates to a method of adjusting the mutual separation of the overlapping metallic cantilever members within the vitreous envelope of a reed switch.

BACKGROUND OF THE INVENTION

In a reed switch, two lightweight metallic rods are hermetically sealed through opposite ends of an elongated hollow glass tube in such a manner that they extend substantially parallel to the longitudinal axis of the tube. A portion of each rod within the tube is flattened out, and these flattened portions (referred to as "reeds") are mutually positioned in such a way as to face each other across a narrow intervening gap (of the order of a fraction of a millimeter) and to overlap each other. Each rod behaves as a cantilever, since it is fixed at one end into the wall of the glass tube, but is free at its flattened end. A portion of each rod protrudes outward through the wall of the tube, to facilitate electrical contact with the portion located within the tube.

The rods, or at least their flattened portions, comprise a soft-magnetic material such as NiFe. Under the influence of an appropriate external magnetic field, which can penetrate the vitreous tube, the flattened portions thus become magnetised and mutually attracted, and will converge and physically contact one another if the external field is strong enough. In this way, the assembly can act as a magnetically-triggered electrical switch. Moreover, if the required magnetic field is generated by an electrical coil wrapped around the glass tube, then the reed switch can be used as an electrical relay.

The value of the external magnetic field strength at which the reeds are caused to contact each other is referred to as the AW-value of the reed switch. The term "AW" is an abbreviation for "Ampère Winding", in reference to the fact that the magnetic field strength generated along the longitudinal axis of a current-carrying coil is determined both by the magnitude of the electrical current in the coil and by the fashion in which the coil is wound (number of turns per axial unit of length, and the radius of the turns). The AW-value of the reed switch is inter alia a sensitive function of the size of the gap between the flattened portions.

Reed switches are usually manufactured in batches according to the specifications of a given customer, and a particular customer's stipulated admissible range of AW-values is generally the most crucial quality-control factor in meeting each order. Despite exercising the greatest of care and accuracy in the manufacturing process, however, the very nature of the reed switch itself results in inevitable deviations from the desired gap-value (and thus AW-value) for a given batch, since automated sealing of lightweight and easily-pliable metallic rods into the walls of a tiny glass envelope can hardly be expected to occur with an absolute guarantee of a strictly maintained mutual orientation, degree of overlap and intervening gap. As a result, a typical batch of reed switches will demonstrate a (Gaussian) distribution of gap-values around the intended gap-value.

Such a distribution of gap-values is obviously wasteful, since only a limited fraction of the obtained values will correspond to an AW-value which is acceptable for a particular customer. The manufacturer is therefore generally required to make each given batch much larger than the corresponding actual order-size, to pick out a sufficient quantity of switches within given specifications, and to sort, label and store the remaining "rejected" switches in the hope that they can be used to fill another order. Such a scenario is highly uneconomic.

SUMMARY OF THE INVENTION

It is an object of the invention to provide a method by which the gap-value of a reed switch can be accurately and controllably adjusted subsequent to the switch's manufacture. It is a further object of the invention that such a method should lend itself to an automated enaction-and-check procedure. It is yet another object of the invention that the obtained method should be relatively quick and cheap in practice, in the interests of competitive pricing.

These and other objects are achieved in a method of adjusting the mutual separation of the overlapping metallic cantilever members within the vitreous envelope of a reed switch, characterised in that a beam of radiant energy to which the envelope is substantially transparent is directed for a controlled period of time through the envelope onto a localised area of at least one of the members, thereby effecting permanent thermally-induced bending of that member about the irradiated area.

In experiments leading to the invention, the inventors directed a controlled, sharply-focused burst of laser radiation through the glass envelope of a reed switch and onto the "back" of one of the reeds therewithin, i.e. onto that surface of the flattened portion facing away from the opposing reed. The metallic material in the highly-localised irradiated area was hereby abruptly heated and caused to expand, forcing the reed-back to temporarily bend away from the irradiating beam. Upon subsequent cooling, however, the reed-back bent back through its original position, and became permanently bent towards the original line of the irradiating beam. It is postulated that this change in bending-direction was caused by the occurrence of plastic deformation in the metallic material within the irradiated area, whereby cooling of the irradiated material caused it to undergo a net contraction.

The bending of one of the reed-backs relative to the other in this manner causes a direct increase in the separation of the flattened portions, i.e. in the assembly's switch-gap. In practice, this increase is generally of the order of a few microns, but seeing as the original switch-gap is only of the order of a fraction of a millimeter, such an increase can represent at least a few per cent of the original switch-gap (and commonly as much as 15–20%, or more).

Needless to say, the same method can also be successfully used to obtain a decrease in the switch-gap, by directing the irradiating beam onto the "front" of one of the reeds (i.e. onto that surface of the flattened portion facing toward the opposing reed) instead of onto its back. This is made possible by the fact that the flattened portions (generally) only overlap to a slight extent, so that a relatively large portion of each can be accessed from all sides.

The obtained change $\Delta g$ in the gap-value can be tailored by appropriate choice of a number of parameters. These include:

The energy fluence $E_i$ of the employed irradiating beam;

The wavelength of the radiation in the beam;

The area $A_i$ of the localised irradiated region on the reed, determined by the extent to which the irradiating beam is focused onto the reed surface. This in turn affects the delivered power per unit area;

The longitudinal distance $x_i$ of the localised irradiated area from the reed's free extremity, within the plane of the flattened portion;

The lateral distance $y_i$ of the localised irradiated area from the reed's longitudinal axis, within the plane of the flattened portion;

The duration $T_i$ of the irradiation.

The inventors have observed that, in general:

(1) The larger the value of $x_i$, the larger will be the value of $\Delta g$. As a rule, the angle $\alpha$ through which the reed is caused to bend away from its longitudinal axis is independent of $x_i$, so that $\Delta g$ is approximately proportional to $x_i$ via the relationship $\Delta g \approx \alpha x_i$ (this relationship holds with a high degree of accuracy for relatively small values of $\alpha$ (less than about 10°) and for values of $x_i$ which significantly exceed the amount of longitudinal overlap of the reeds (by about a factor of ten, or more); such requirements are easily met in common practice);

(2) There is an essentially linear relationship between $\alpha$ and $E_i$, up to a certain threshold value.

A particular embodiment of the inventive method is characterised in that the beam of radiant energy is embodied as a pulsed laser beam. By pulsing the beam, its energy content is concentrated into successive short bursts, in which the delivered power is consequently much greater than in the case of a continuous energy output. This is of advantage in view of the observation made under point (2) above. Particularly suitable pulsing for this purpose can be achieved, for example, by optically pumping the employed laser device with a flash source.

It should be noted in this context that use of too high a laser fluence can have a detrimental effect on the quality of the inventive adjustment procedure. For example, it has been observed in optimisation tests that delivery of excessive laser power to the reed surface can cause significant evaporation of metallic material in and around the irradiated area. Subsequent precipitation of such evaporated material onto the reed's contact-surface can cause formation of highly-undesirable "point contacts" thereupon, with the attendant risk of arc-over during switch-closure. On the other hand, however, too low a laser fluence will not have the desired effect, since it will not produce sufficient heating of the reed to induce the desired localised plastic deformation.

In a further embodiment of the inventive method in which irradiation is conducted with a pulsed laser beam, the pulse-length of the employed laser radiation is chosen to lie in the range 0.1–2.0 ms, and the delivered radiative energy per pulse is chosen to lie in the range 0.05–1.0 J. Values within these ranges typically result in $\Delta g$-adjustments of the order of 10–20% per radiative "shot" (for $x_i$ in the range 0.5–4.5 mm), with negligible production of evaporated metallic material. $\Delta g$-adjustments of this size are quite practical, since smaller adjustments (e.g. 5%) generally fall within the tolerances quoted by the customer anyway.

The manner in which the reed bends under the influence of irradiation is inter alia a function of $y_i$. When $y_i$ is zero (i.e. when the reed is irradiated at some point along its longitudinal axis), the bending motion of the reed occurs linearly in a direction substantially perpendicular to the plane of the flattened portion. However, when $y_i$ has a value other than zero (i.e. when the reed is irradiated at a point to one side of its longitudinal axis), the bending motion of the reed will additionally contain a degree of torsion about the longitudinal axis. Such torsion decreases the homogeneity of the switch-gap, since it causes one edge of the irradiated flattened portion to be twisted towards the opposing reed, whilst the facing edge is twisted away from the opposing reed. However, this effect can be prevented by ensuring that the reed is irradiated symmetrically with respect to its longitudinal axis, e.g. by successively (or simultaneously) irradiating it at two points which are mirror images of one another in the longitudinal axis.

The homogeneity of the change $\Delta g$ in the switch-gap improves even further when the irradiated region on the reed's surface extends across the full width of the reed (measured substantially at right angles to the reed's longitudinal axis). One way of achieving such irradiation is to quickly scan a sharply focused laser beam across the width of the reed, thereby creating a narrow "score mark" instead of a spot-like burn. Experiments have shown that, for this purpose, typically suitable scan speeds of the laser beam across the reed surface generally lie in the range 20–600 mm/s.

In the manufacturing process of a typical reed switch, heat from an infra-red lamp is employed to achieve sealing of the metallic cantilever members into the glass envelope. The vitreous material of the envelope is therefore generally green in colour, so as to maximise its coefficient of absorption at infra-red wavelengths. In the case of such a reed switch, an advantageous embodiment of the inventive method is characterised in that the employed laser radiation has a wavelength in the range 525–540 nm, to which the commonly used green glasses are highly transparent. Radiation of this wavelength, and of sufficient intensity, can be conveniently derived from a (pulsed) frequency-doubled Nd:YAG laser, for example.

It has already been explained that the induced alteration $\Delta g$ of the switch gap is dependent upon the geometrical positioning of the localised irradiated area on the reed, inter alia via the parameters $x_i$ and $y_i$. In order to ensure maximum accuracy of adjustment, while yet allowing optimum flexibility and the opportunity to adjust variably on the basis of feed-back measurements, the inventors have developed an apparatus for accurately positioning the reed switch with respect to the irradiating beam. This apparatus employs an electromagnetic coil both to orient the reed switch and to determine its AW-value, whilst a television camera is used to accurately aim the irradiating beam with respect to the reed's free extremity (thereby determining $x_i$, and ultimately $\alpha$). Exploiting the essentially linear dependence of $\alpha$ on $E_i$, the fact that $\Delta g \approx \alpha x_i$, and the ultimate dependence of the (measured) AW-value on $\Delta g$, the power and position of a single (or multiple) laser shot required to produce a desired AW-value can be (automatically) calculated, the actual result of such a shot can subsequently be compared with expectations via feedback measurements, and any necessary supplementary shots can then be made. This entire procedure therefore lends itself to fast, automated enaction.

BRIEF DESCRIPTION OF THE DRAWING FIGURES

The invention and its attendant advantages will be further elucidated with the aid of exemplary embodiments and the accompanying schematic drawings, not all of uniform scale, whereby:

DESCRIPTION OF THE INVENTION

Embodiment 1

FIGS. 1–4 render various views of a reed switch whose switch-gap has been adjusted in accordance with the current inventive method. Corresponding features in the various Figures are denoted by identical reference symbols. The Figures are not drawn to scale, so as to facilitate clear illustration of the various aspects of the inventive method.

Figure 1:
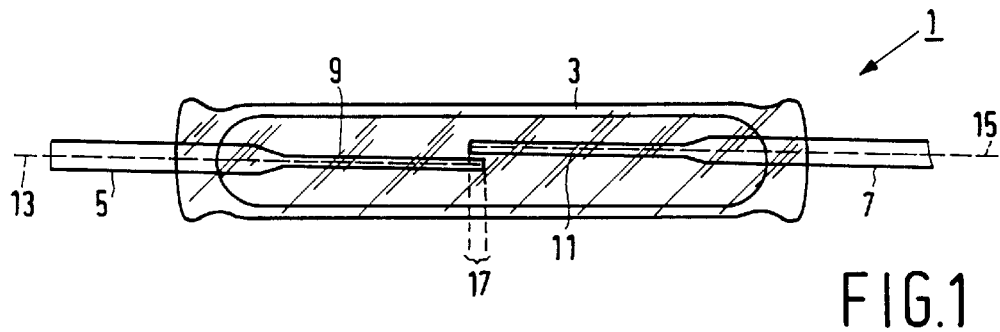
FIG. 1 shows an elevation of a reed switch in which the switch-gap has been adjusted using a method in accordance with the present invention.
Figure 2:
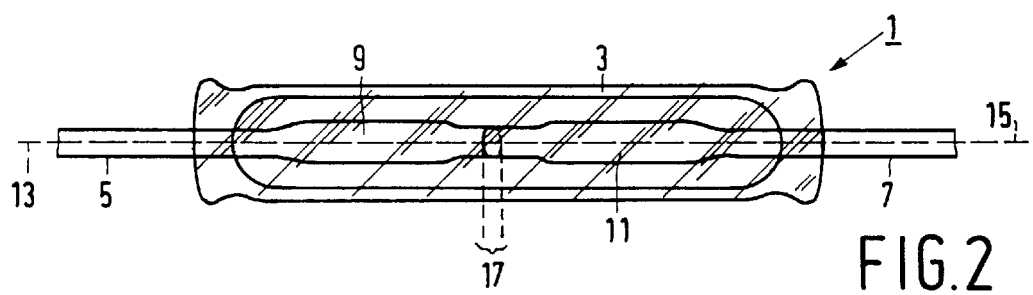
FIG. 2 is a plan view of the subject of FIG. 1.

FIG. 1 shows an elevation of a reed switch 1 in which the switch-gap has been adjusted using the method according to the invention. The switch 1 comprises an oblong green glass envelope 3 (in practice, of the order of 10 mm long) into which two metallic cantilever members 5, 7 have been sealed at opposite ends. These members 5, 7 are comprised of a soft-magnetic NiFe alloy (permalloy). They are substantially parallel, and have flattened portions 9, 11 which overlap in the region 17. Also depicted are the longitudinal axes 13, 15 of the respective members 5, 7. FIG. 2, renders a plan view of the same reed switch 1.

Figure 3:
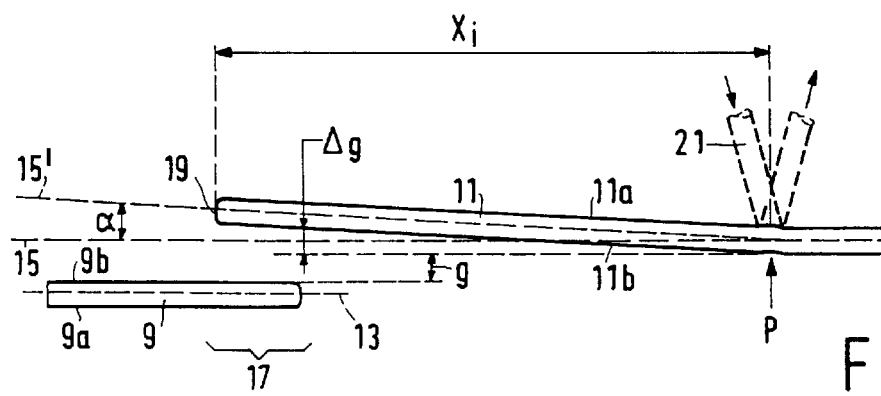
FIG. 3 depicts a detail of FIG. 1.

FIG. 3 depicts the central region of FIG. 1 in more detail. As here illustrated, the switch is in its relaxed state, with an open gap between the flattened portions 9, 11. Each of these portions 9, 11 has a "back" surface 9a, 11a and a "front" surface 9b, 11b. The minimum separation of the front surfaces 9b and 11b, measured perpendicular to the (local) plane of one of these surfaces, defines the size (value) of the switch-gap.

As here depicted, the portions 9, 11 had an original switch-gap of size g, but this has since been increased by an amount Δg using the inventive method. To this end, a localised region of the back surface 11a was briefly irradiated at a location p situated at a distance $x_i$ from the free extremity 19 of the flattened portion 11, thereby causing the free end of the portion 11 to bend slightly about point p through an angle α with respect to the longitudinal axis 15, in a direction away from opposing portion 9. The irradiating beam 21 is here schematically illustrated via a dashed outline.

A further possibility is to irradiate a localised region of the front surface 11b of the portion 11, in which case the free end of that portion 11 can be caused to bend towards the opposing portion 9.

Figure 4:
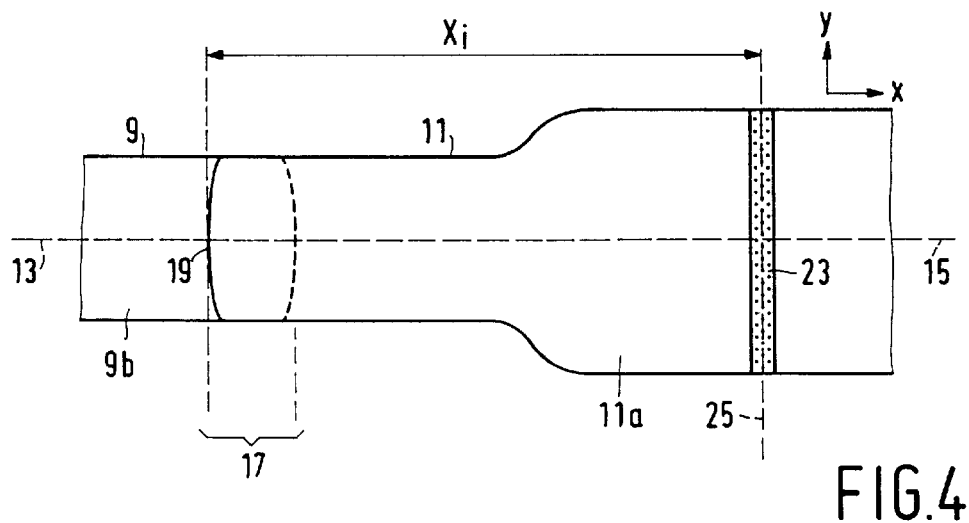
FIG. 4 shows a plan view of FIG. 3.

FIG. 4 renders a (partial) plan view of the flattened portions 9, 11 as depicted in FIG. 3. In particular, the mark 23 made by the irradiating beam 21 is schematically depicted. In this specific case, the mark 23 extends across the full width of the reed-back 11a along the axis 25, and was made by rapidly drawing the (sharply focused) irradiating beam 21 across the surface 11a along the axis 25.

As an alternative to the score mark 23, the reed-back 11a can also be irradiated at one or more distinct points along the axis 25. It is then preferable to position these points symmetrically with respect to the longitudinal axis 15, e.g. by irradiating at a single point at the intersection of axes 15 and 25, or by irradiating at two points on the axis 25 which are mirror images of each other in the axis 15, etc.

Embodiment 2

In a type RI-23 reed switch, commercially supplied by Philips Electronics, the glass tube 3 has a length of about 14 mm and a diameter of about 2.5 mm. The flattened portions 9, 11 are each approximately 4.5 mm long, 1.2 mm wide and 0.15 mm thick. The amount of longitudinal overlap 17 is about 0.2 mm, and the gap-value g is approximately 30 μm (depending on the exact specifications of a given batch).

While testing the inventive method upon a series of such reed switches from a single batch, the inventors irradiated the back 11a of each flattened portion 11 using a beam 21 from a frequency-doubled Nd:YAG laser, with a wavelength of 532 nm and a pulse-length of 0.5 ms. The beam 21 was focused to an approximate diameter of 200 μm, and each reed switch was subjected to a single "shot" at some point along its longitudinal axis 15.

By plotting the obtained bending-angle α against the delivered radiative energy E per shot, it was observed that, for the particular batch of reed switches in question:

$$\alpha \approx (29.3 \times E) - 2.4 \qquad (1)$$

wherein α is expressed in mrad and E is expressed in J. The value of $x_i$ required to obtain a particular gap-increase Δg could then be calculated using the formula:

$$x_i \approx \frac{\Delta g}{\alpha} \qquad (2)$$

wherein $x_i$ and Δg are both expressed in mm (for example).

For E=0.25 J, say, the corresponding value of α is approximately 4.9 mrad, according to formula (1). In order to obtain a 50% increase in g, for example, irradiation should therefore occur at a longitudinal distance $x_i \approx 3.1$ mm from the free extremity 19, according to formula (2). The obtained gap-increase Δg is then 4.9 mrad ×3.1 mm=15.2 μm, which is about 50% of 30 μm (as required).

We claim:

1. A method of adjusting the mutual separation of the overlapping metallic cantilever members within a vitreous envelope of a reed switch, characterised in that:
   at least one of said members is arranged with a first end portion sealed to said envelope, and a free end portion in an initial position free from contact with said envelope,
   a beam of radiant energy to which the envelope is substantially transparent is directed for a controlled period of time through the envelope onto a localised area of at least one of the members between said first end portion and said free end portion, and effecting permanent thermally-induced bending of that member about the irradiated area without contact between said free end portion and said envelope.

2. A method according to claim 1, characterised in that the beam of radiant energy is embodied as a pulsed laser beam.

3. A method according to claim 2, characterised in that the pulse-length of the laser radiation is chosen to lie in the range 0.1–2.0 ms, and that the delivered radiative energy per pulse is chosen to lie in the range 0.05–1.0 J.

4. A method according to claim 2, wherein the vitreous envelope has a green color, characterized in that the laser radiation has a wavelength in the range of about 525–540 nm and is derived from a frequency-doubled Nd:YAG laser.

5. A method as claimed in claim 1, characterized in that said thermally-induced bending bends the member first in a direction away from the beam of radiant energy, and during cooling the member bends in an opposite direction past the initial position.

6. A method of adjusting the mutual separation of the overlapping metallic cantilever members of a reed switch, wherein the switch comprises an envelope which is substantially transparent to radiant energy of a given wavelength, and two metallic cantilever members each having (i) a respective first end portion extending through and sealed to the switch envelope, (ii) a respective contact portion at a second end of the respective member, and (iii) a respective flattened portion which is flattened with respect to the respective first end portion, extends between the respective first portion and contact portion, and is located within and free from contact with the envelope, the contact portions of the members being disposed in a mutually overlapping relationship, and the second end of at least one of said members being free from contact with said envelope, characterized in that the method comprises:

selecting a localized area of the flattened portion of said at least one of said members, directing a beam of radiant energy having said given wavelength through said envelope onto said area, and controlling the intensity of said beam and the duration of time for which the beam is directed onto said area to effect a permanent thermally-induced bending of the flattened portion about said area.

7. A method as claimed in claim 6, characterized in that the step of directing a beam comprises providing a pulsed laser beam.

8. A method as claimed in claim 7, wherein the vitreous envelope has a green color, characterized in that the laser radiation has a wavelength in the range of about 525–540 nm and is derived from a frequency-doubled Nd:YAG laser.

9. A method as claimed in claim 7, characterized in that the pulse length of the laser radiation is chosen to lie in the range of 0.1 to 2.0 ms, and that the delivered radiative energy per pulse is chosen to lie in the range of 0.05 to 1.0 J.

10. A method as claimed in claim 9, wherein the vitreous envelope has a green color, characterized in that the laser radiation has a wavelength in the range of about 525–540 nm and is derived from a frequency-doubled Nd:YAG laser.

11. A reed switch comprising:

an envelope which is substantially transparent to radiant energy of a given wavelength, and two metallic cantilever members each having (i) a respective first end portion extending through and sealed to the switch envelope, (ii) a respective contact portion at a second end of the respective member, and (iii) a respective flattened portion which is flattened with respect to the respective first end portion, extends between the respective first portion and contact portion, and is located within and free from contact with the envelope, the contact portions of the members being disposed in a mutually overlapping relationship, characterized in that the flattened portion of at least one reed is bent away from the other reed at a location which has been heated on the side remote from said other reed.

12. A reed switch as claimed in claim 11, wherein at least over the region where said reed is bent, the vitreous envelope has a green color.

13. A method of adjusting the mutual separation of the overlapping metallic cantilever members within a vitreous envelope of a reed switch, wherein said vitreous envelope has a green color, characterized in that a beam of radiant energy, derived from a frequency-doubled Nd:YAG laser and having a wavelength in the range of about 525–640 nm, to which the envelope is substantially transparent, is directed for a controlled period of time through the envelope onto a localized area of at least one of the members to effect permanent thermally-induced bending of that member about the irradiated area.

14. A method as claimed in claim 13, characterized in that the pulse length of the laser radiation is chosen to lie in the range of 0.1 to 2.0 ms, and that the delivered radiative energy per pulse is chosen to lie in the range of 0.05 to 1.0 J.

* * * * *